UNITED STATES PATENT OFFICE.

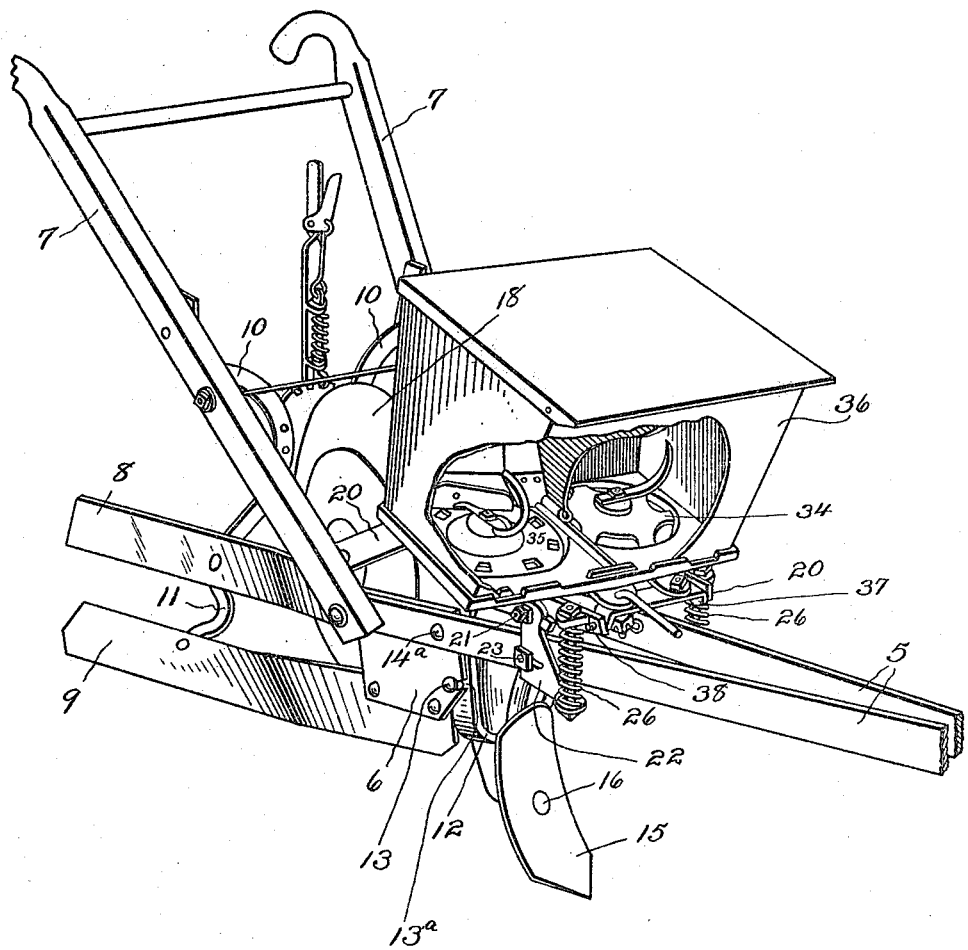

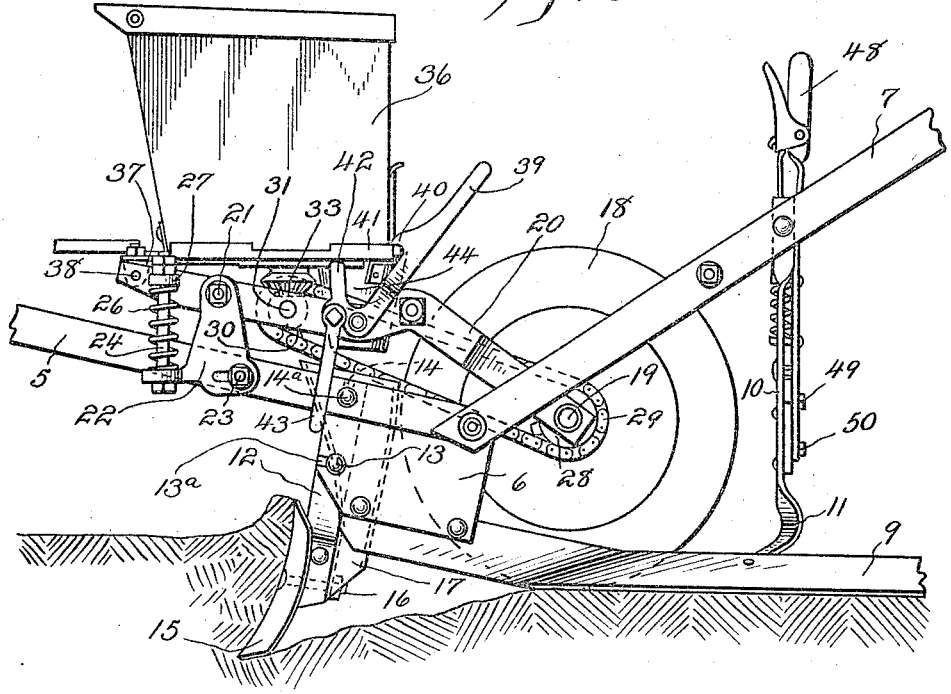
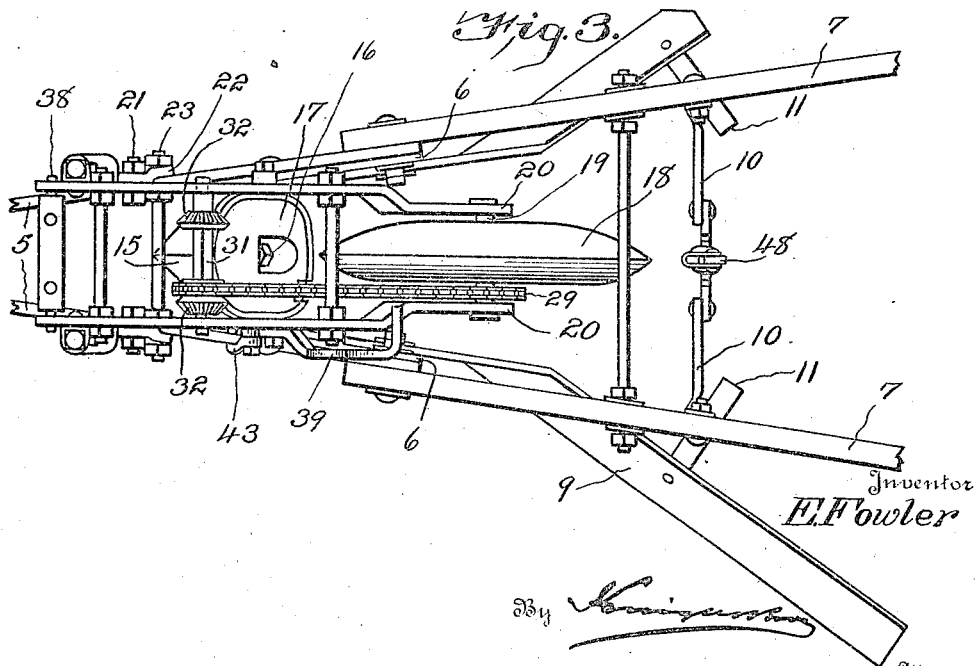

EDWARD FOWLER, OF CEDAR GROVE, GEORGIA.

PLANTER.

1,282,798.         Specification of Letters Patent.         Patented Oct. 29, 1918.

Original application filed March 6, 1916, Serial No. 82,457. Divided and this application filed February 20, 1917. Serial No. 149,835.

*To all whom it may concern:*

Be it known that I, EDWARD FOWLER, a citizen of the United States, residing at Cedar Grove, in the county of Walker and State of Georgia, have invented certain new and useful Improvements in Planters, of which the following is a specification.

My invention relates to planters of the type shown in my co-pending application 82,457, filed March 6, 1916, of which this application is a division.

The invention has for its object the provision of an improved planter constructed in such manner as to adapt it to deposit either seed or fertilizer, or both, in a furrow, and to cover the seed or fertilizer, or both, with soil during the passage of the planter.

It is a further object of the invention to provide improved means for feeding the seed and fertilizer and for actuating the said feeding means.

It is a further object of the invention to provide a planter comprising a seed or fertilizer containing hopper, together with means for yieldingly supporting said hopper upon the planter frame and establishing driving connection between the feeding mechanism of the hopper and a ground wheel.

It is a further object of the invention to provide a planter of the type above set forth in which the feeding mechanism may be readily thrown out of action when it is desired to move the planter from field to field or to a place of storage.

Further objects and advantages of the invention will be set forth in the detailed description which now follows:

In the accompanyings drawings,

Figure 1 is a partial perspective view of a planter constructed in accordance with the invention with certain of the parts broken away;

Fig. 2 is a side elevation of the planter with certain of the parts broken away:

Fig. 3 is a plan view of the parts shown in Fig. 1 with the hopper removed;

Like numerals designate corresponding parts in all of the figures of the drawing.

Figure 4:
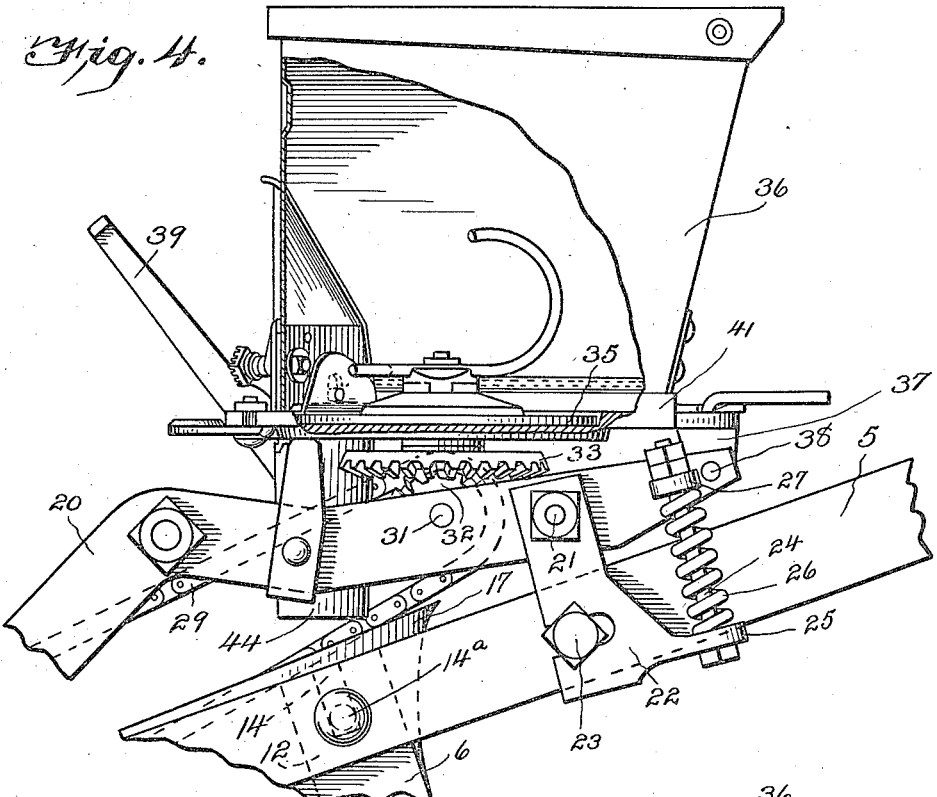
Fig. 4 is a fragmentary side view illustrating the hopper supporting frame and with a part of the hopper broken away.
Figure 5:
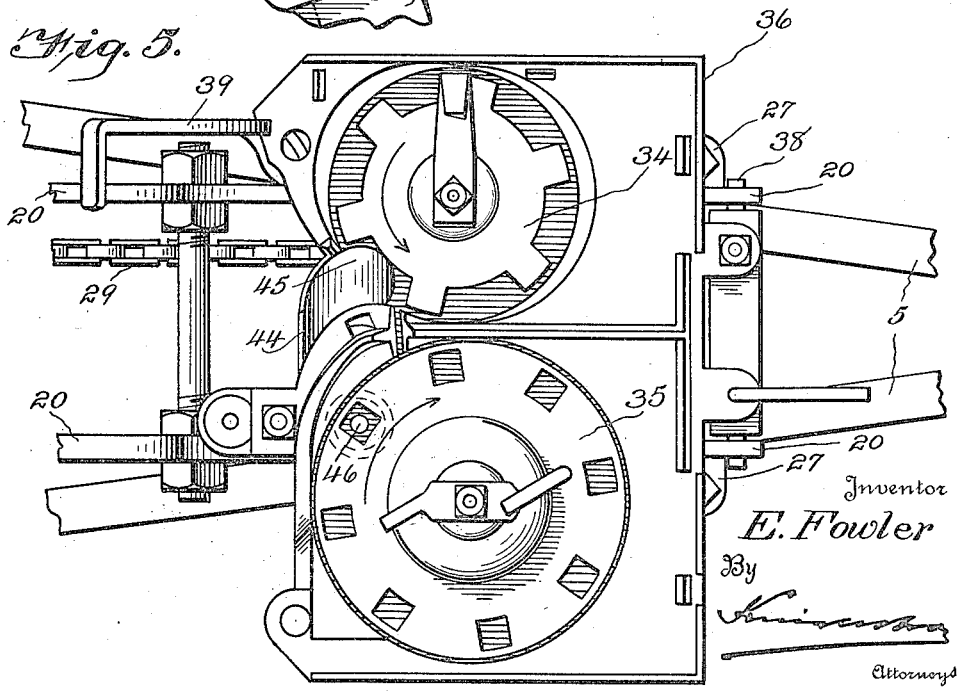
Fig. 5 is a view partly in plan and partly in horizontal section of the hopper and its associated parts.

In the drawings, the numeral 5 designates rearwardly divergent draw-bars constituting a beam. These beams carry depending plates 6 at their rear ends. A pair of hinged handle bars 7 have their lower ends connected to the rear ends of the bars 5. The forward ends of upper blades 8 and lower blades 9 are secured to the plates 6. Braces 10 having bent portions 11 are connected to the blades 8 and 9, and to the handles 7. A depending standard 12, with a central vertical space between the sides thereof, is secured between the plates 6 by bolts 13 which engage in slots 13ª of the plates 6 and this standard is provided in its upper ends with slots 14 which engage with bolts 14ª carried by the bars 5, whereby the standard 12 is secured in position. A plow share 15 is secured to the lower end of the standard 12 by bolt 16, and serves to open the furrow in which the seed or fertilizer, or both, are to be deposited. The seed and fertilizer pass downwardly through a spout 17 that is secured to the rear face of the standard 12 by the bolt 16. It will, therefore, be seen that this bolt performs the double function of securing the plow share and the spout 17 in position. A trailer wheel 18 is mounted upon a shaft 19 carried by the rear ends of an oscillating frame comprising bars 20 that are pivoted at 21 upon brackets 22 carried by the bars 5. These brackets are slotted for the reception of bolts 23 by which the brackets are adjustably secured in position. Rods 24 pass through forward extensions 25 of the brackets 22 and springs 26 encircle these rods and bear between the extensions 25 and lateral extensions 27 of bars 20. It will, therefore, be seen that these springs normally tend to throw the forward ends of the bars 20 upwardly and to depress the trailer wheel 18 to cause it to engage in the furrow behind the plow share 14. The trailer wheel carries a sprocket wheel 28 that is connected through the medium of a sprocket chain 29 with a sprocket wheel 30 upon a shaft 31, that is journaled in the bars 20. The shaft 31 carries pinions 32 which mesh with pinions 33 of the distributer disks 34 and 35, said disks being disposed in the bottom of a planter box 36. The lower forward edge of the planter box is provided with depending ears 37 that are trunnioned at 38 in the forward ends of the bars 20. It will, therefore, be seen that the planter box is capable of being tipped bodily forward to bring the pinions 33 out of mesh with the pinions 32 so that the planter may be transported without actuating the distributing mechanism. For holding the planter box securely in the position illustrated in Fig. 2, an elbow lever 39 is pivoted at the elbow point to one of the bars 20 and a nose 40 on one arm of this lever is intended to engage with the bottom 41 of the planter box when the lever is moved upwardly. The other arm of the lever is short and has an upwardly directed extension 42 forming a support for the under side of the bottom 41. A hook 43 is journaled at the end of the short arm of the lever and is intended to grip one of the bars 5 when the lever 39 is thrown outwardly and downwardly.

Whenever the lever 39 is thrown outwardly and downwardly, and the planter box is released, the latter will be partly raised by the extension 42 on the shorter arm of the lever, but at the same time, the hook 43 gripping beneath the beam 5 will cause the wheel 18 to be pressed relatively to the beam formed by the bars 5 so that the plow share 15 and the blades will be lifted out of the ground and the apparatus will be run on the wheel 18. Since, however, the planter box has been partly swung forward, pinions 32 and 33 will be automatically brought out of mesh with each other so that at this time no feeding from the planter box will take place. The fact that the trailer wheel is pressed downwardly by the springs 26 into the furrow formed by the plow share 15, results in the planter box being carried smoothly forward even if the ground is uneven.

A spout 44 is supported from the under side of the planter box and its lower end registers with the upper end of the spout 17. The spout 44 underlies openings 45 and 46 formed in the bottom 41 and through which openings the distributers 34 and 35, in their rotation, discharge predetermined quantities of seed or fertilizer, or both. The particular construction of the discharging or dispensing mechanism forms no part of the present invention, since various types of distributing mechanism may be employed to discharge the contents of the planter box or hopper.

In operation, the plow share 15 opens the furrow and the oscillating frame formed by bars 20 is caused, under the influence of springs 26, to maintain the wheel 18 in the furrow opened by the plow share. Rotation of the wheel 18 through sprocket wheel 28, sprocket chain 29 and sprocket wheel 30, imparts rotation to the distributer disks 34 and 35 through the connections described. Rotation of these disks, as before stated, discharges predetermined amounts of fertilizer or seed, or both, through the openings 45 and 46 and into spouts 44 from whence it falls through spout 17 and is discharged into the furrow directly behind the plow share. In the travel of the planter, the lower blades lie beneath the surface of the ground and the upper blades scrape along the surface of the ground and the bent portions 11 of the braces 10 serve to turn the loosened soil over the furrow in order to cover the seed dropped from the planter box.

The manipulation of a handle 48 serves to adjust the blades 8 and 9 with respect to handles 7, said handle being pivoted at 48 to one of the braces and at 50 to the other of the braces. However, this adjustment is a feature of the cultivating function of the apparatus and has been fully described in my aforesaid application, and is referred to here merely to make it clear that the inwardly bowed portions of the braces are connected to each other.

An important feature of my invention is the efficient manner in which the seeds are distributed, packed and protected.

As the furrow is opened by the plow point, the seed, fertilizer, or both, is dropped in the furrow and enough fine mulch from the plow point passes into the furrow to cover the deposited material, such as seeds etc. The mulch drops on the deposited material in advance of the packing wheel, and as the wheel follows directly upon the deposit of the soil, it packs it upon the seed, fertilizer, etc. The fine mulch which passes along the lower blades and upper blades will be guided in behind the wheel by the curved braces so that it will pass on top of the packed soil, not only closing the furrow, but leaving a covering of loose fine soil which keeps out air and capillaries, and also renders the furrow well adapted to retain the moisture to the advantage of the seeds readily in excess of what could be accomplished, unless some protective covering was placed over the packed soil in the furrow.

In the event that it is desired to use the device as a side dressing tool, that is, to distribute fertilizer and cultivate at one passage, the device will have the form shown in Fig. 3, in which the cultivator blade on one side is shorter than its corresponding blade on the shorter side of the plow point. In operation, the fertilizer is dropped immediately behind the plow point and it will be covered by the soil leaving the point, and then packed by the wheel and the loose mulch will be distributed over the packed soil as previously described.

The device may also be used in the planting of additional seed, either with or without fertilizer, in the cultivation of a previously planted crop. When this is done, the device partakes of the form shown in Fig. 2, or in Fig. 3.

It is to be understood that the invention

I claim:—

1. In an agricultural implement of the class described, having a V-shaped beam with a plow share attached and a stretcher bolt connecting the two sides of the beam, an oscillating frame and journal brackets therefor mounted on said stretcher bolt, a trailer wheel on said oscillating frame and springs for pressing the wheel downward, a planter box secured on the frame for delivering material in the furrow cut by the plow share, while said wheel follows behind in the furrow held down firmly by said springs, said planter box having hinged connection with said frame and a locking device between the frame and the box.

2. In an agricultural implement of the class described, having a V-shaped beam with a plow share attached and a stretcher bolt connecting the two sides of the beam, an oscillating frame and journal brackets therefor mounted on said stretcher bolt, a trailer wheel on said oscillating frame for delivering material in the furrow cut by the plow share, while said wheel follows behind in the furrow held down firmly by said springs, said planter box having hinged connection with said frame and a locking device between the frame and the box, said locking device comprising an elbow lever with a projection on one arm for engaging with said planter box, said lever being journaled at the elbow, the other arm of the lever constructed as a support for the box when locked and adapted to raise the box when the projection is disengaged.

3. In an agricultural implement of the class described, having a V-shaped beam with a plow share attached and a stretcher bolt connecting the two sides of the beam, an oscillating frame and journal brackets therefor mounted on said stretcher bolt, a trailer wheel on said oscillating frame and springs for pressing the wheel downward, a planter box secured on the frame for delivering material in the furrow cut by the plow share, while said wheel follows behind in the furrow held down firmly by said springs, said planter box having hinged connection with said frame and a locking device between the frame and the box, said locking device comprising an elbow lever with a projection on one arm for engaging with said planter box, said lever being journaled at the elbow, the other arm of the lever constructed as a support for the box when locked and adapted to raise the box when the projection is disengaged, a hook swiveled on said other arm constructed to grip said beam, when the lever is unlocked, thus depressing said trailer wheel relatively to said beam and raising the plow share out of the ground.

4. In an agricultural implement of the class described, a beam, a plow share attached thereto, an oscillating frame carried by the beam, a trailer wheel on said oscillating frame and springs for pressing the wheel downward, a planter box secured on the frame for delivering material in the furrow cut by the plow share, said planter box having hinged connection with said frame, and a locking device between the frame and the box.

5. In an agricultural implement of the class described, a beam, a plow share attached thereto, an oscillating frame carried by the beam, a trailer wheel on said oscillating frame and springs for pressing the wheel downward, a planter box secured on the frame for delivering material in the furrow cut by the plow share, said planter box having hinged connection with said frame, and a pivoted lever movable in one direction to lock the box to the frame and movable in another direction to cause relative movement between the box and the frame.

6. In an agricultural implement of the class described, a beam, a plow share attached thereto, an oscillating frame carried by the beam, a trailer wheel on said oscillating frame and springs for pressing the wheel downward, a planter box secured on the frame for delivering material in the furrow cut by the plow share, said planter box having hinged connection with said frame, and a pivoted lever movable in one direction to lock the box to the frame and movable in another direction to cause relative movement between the box and the frame, and means controlled by the lever for depressing the trailer wheel when the box is unlocked from the frame.

7. In an agricultural implement of the class described, a beam, a plow share attached thereto, a planter box having hinged connection with said beam, a trailer wheel in rear of the planter box and also having hinged connection with said frame, a locking lever for said planter box having a projection adapted, when the lever is moved in one direction, to tilt said box on its hinge, and means operated by said lever for causing the trailer wheel to be depressed.

The foregoing specification signed at Washington, District of Columbia, this 17th day of January, 1917.

EDWARD FOWLER.